US011161667B2

(12) United States Patent
Laine et al.

(10) Patent No.: US 11,161,667 B2
(45) Date of Patent: Nov. 2, 2021

(54) PLASTIC CONTAINER WITH PIVOTABLE BASE PORTION

(71) Applicant: KRONES AG, Neutraubling (DE)

(72) Inventors: Ludovic Laine, Hainsacker (DE); Gerald Huettner, Vilseck (DE); Bastian Tissmer, Regensburg (DE); Wang Bi-Jang, JiangSu (CN)

(73) Assignee: KRONES AG

( * ) Notice: Subject to any disclaimer, the term of this patent is extended or adjusted under 35 U.S.C. 154(b) by 0 days.

(21) Appl. No.: 16/496,901

(22) PCT Filed: Dec. 13, 2017

(86) PCT No.: PCT/EP2017/082527
§ 371 (c)(1),
(2) Date: Sep. 23, 2019

(87) PCT Pub. No.: WO2018/171920
PCT Pub. Date: Sep. 27, 2018

(65) Prior Publication Data
US 2020/0087045 A1 Mar. 19, 2020

(30) Foreign Application Priority Data
Mar. 21, 2017 (DE) .................... 10 2017 106 000.6

(51) Int. Cl.
*B65D 79/00* (2006.01)
*B65D 1/02* (2006.01)
(Continued)

(52) U.S. Cl.
CPC ............ *B65D 79/005* (2013.01); *B29C 49/06* (2013.01); *B29C 49/541* (2013.01);
(Continued)

(58) Field of Classification Search
CPC .................... B65D 79/005; B65D 79/0081; B65D 1/0276; B65D 1/0284; B65D 2501/0036; B29C 49/541
See application file for complete search history.

(56) References Cited

U.S. PATENT DOCUMENTS 5,503,283 A   4/1996 Semersky .................. 215/375
9,751,679 B2* 9/2017 Stelzer .............. B65D 79/005
(Continued)

FOREIGN PATENT DOCUMENTS

CN       105050903    11/2015   .............. B65D 1/02
WO   WO2013025463     2/2013   .............. B65D 1/02

OTHER PUBLICATIONS

German Search Report (w/machine translation) issued in application No. 10 2017 106 000.6, dated Dec. 11, 2017 (10 pgs).
(Continued)

*Primary Examiner* — Robert B Davis
(74) *Attorney, Agent, or Firm* — Hayes Soloway P.C.

(57) ABSTRACT

A plastic container has a mouth portion, a main body, and a base portion which adjoins the main body. The base portion has a central region as well as a diaphragm which runs in a circumferential direction and extends from the central region to the main body. The central region is pivotable relative to the main body between at least two positions which differ with regard to an internal volume of the container. The wall has at least one and preferably at least two circumferential grooves and are spaced apart from one another. The central region has a projection extending in the direction of the interior of the plastic container, and at least one web extending at least in part in a radial direction in the circumferential wall.

20 Claims, 7 Drawing Sheets

(51) Int. Cl.
  *B29C 49/54* (2006.01)
  *B29C 49/06* (2006.01)
  *B29L 31/00* (2006.01)

(52) U.S. Cl.
  CPC ......... *B65D 1/0276* (2013.01); *B65D 1/0284* (2013.01); *B29L 2031/7158* (2013.01); *B65D 2501/0036* (2013.01)

(56) References Cited

U.S. PATENT DOCUMENTS

| | | | | |
|---|---|---|---|---|
| 2002/0063105 A1 | 5/2002 | Darr et al. | ..................... | 215/373 |
| 2013/0043202 A1 | 2/2013 | Wurster et al. | ................. | 215/40 |
| 2013/0043209 A1* | 2/2013 | Wurster | ................. | B65B 61/24 |
| | | | | 215/379 |
| 2013/0087954 A1 | 4/2013 | Tsuchiya | | |
| 2013/0180943 A1 | 7/2013 | Kurihara | .............. | B65D 23/001 |
| 2016/0304233 A1 | 10/2016 | Hermel | | |

OTHER PUBLICATIONS

International Preliminary Report on Patentability (w/translation) issued in application PCT/EP2017/082527, dated Sep. 24, 2019 (15 pgs).

International Search Report and Written Opinion (w/translation) issued in application PCT/EP2017/082527, dated Mar. 9, 2018 (23 pgs).

First Chinese Office Action issued in Chinese Patent Appln. Serial No. 201780088615.6, dated Jul. 23, 2020.

European Official Action issued in related European Patent Appln. Serial No. 17 825 784.6, dated Sep. 22, 2020 with machines English translation, 15 pages.

* cited by examiner

PLASTIC CONTAINER WITH PIVOTABLE BASE PORTION

BACKGROUND OF THE INVENTION

The present invention relates to plastic containers. Plastic containers have been known for a long time from the prior art, in particular for storing beverages. Various procedures are known for filling containers. Thus, in a production variant it is known that a liquid, such as a beverage, is introduced while hot into the container and then the container is closed. This procedure is suitable for example when iced teas and the like are bottled. During this bottling, however, the problem arises that the liquid located in the container contracts and thus the container is subjected to a negative pressure. Containers are known from the prior art in which this negative pressure is compensated for by panels in the side walls which deform due to the negative pressure. Containers are also known from the prior art in which a base part can be displaced or turned from a first position into a second position in order thus to reduce the internal volume of the container.

The object of the present invention is to provide a plastic container which in particular, even by a low final blow moulding pressure, enables an improved mouldability of the base geometry.

SUMMARY OF THE INVENTION

A plastic container according to the invention has a mouth portion as well as a main body adjoining this mouth portion in a longitudinal direction of the plastic container, this main body completely surrounding an internal volume of the plastic container in a circumferential direction of the plastic container. Furthermore, the plastic container has a base portion which adjoins the main body, wherein this base portion has a central region as well as a wall which runs in the circumferential direction of the plastic container and extends from the central region to the main body (in this sense, therefore, this wall may also be a circumferential wall with respect to the longitudinal direction).

In this case the central region is pivotable relative to the main body between at least two positions, wherein these two positions differ with regard to an internal volume of the plastic container and wherein, in order to reach these pivot positions between the central region and the main body, a pivoting section is formed which is circumferential with respect to the longitudinal direction of the plastic container.

According to the invention, the wall (extending in the circumferential direction) has at least one and preferably two grooves which are at least partially circumferential with respect to the longitudinal direction of the plastic container and are spaced apart from one another, and the central region has a projection extending in the direction of the interior of the plastic container.

In this case this projection is formed like a dome. The grooves are preferably formed inside the wall extending in the circumferential direction.

The said grooves preferably form a configuration in the manner of a loudspeaker diaphragm. This is preferably pivotable in its entirety. The wall preferably has a conical configuration in at least one pivot position.

The plastic container is preferably a plastic container which is suitable and intended to hold a liquid volume which is between 200 ml and 2 l. The plastic is preferably PET. However, other plastics could also be considered.

An injection point is again preferably arranged in the centre of the central region. In a further advantageous embodiment the main body is formed without panels and in particular without a region which is suitable and intended to compensate for negative pressures inside the container due to a change in volume of the interior. Thus, this compensation for the change in volume takes place exclusively by means of the base region and in particular by means of the aforementioned pivot mechanism of the base portion. This central region is preferably rotationally symmetrical. This central region preferably also contains a (geometric) axis of symmetry of the plastic container.

In a further advantageous embodiment the said pivoting section is formed radially outside the circumferential grooves. This means that preferably all wall regions which also contain the circumferential grooves are pivoted jointly.

Preferably a base contour (viewed in a projection in a direction perpendicular to the longitudinal direction of the container) of the base (that is to say, a contour which for instance does not take the above-mentioned grooves into consideration), starting from a central centre point, established by a first preferably rectilinear section or a section having a very high radius of curvature, which is adjoined by a curvature with a predetermined radius. In turn, this radius is preferably adjoined by a further rectilinear section (the above-mentioned grooves are preferably arranged on this rectilinear section) and this rectilinear section is preferably adjoined by a curved region, wherein this curved region is preferably curved in the reverse direction of curvature to the above-mentioned first curved region.

The said second curved region is preferably again adjoined by a substantially rectilinear section and this in turn is adjoined by a curved section which, however, is formed here as a function of higher degree or as a so-called spline. This said first spline is preferably adjoined by a second spline with a reverse curvature. This second spline in turn is preferably adjoined by a rectilinearly extending section which at least also extends downwards in the longitudinal direction (terms such as downwards or upwards are defined in terms of an upright container).

This substantially rectilinear section can be adjoined by a substantially horizontal section and this in turn is adjoined by the above-mentioned main body or also a curved section with a very high radius of curvature. Preferably, therefore, a change in volume of the interior of the container is achieved by pivoting or movement of the said wall portion.

In a further advantageous embodiment, the central region in a curved circumferential transition section merges into the circumferential wall (that is to say the wall extending in the circumferential direction), wherein preferably a curvature of this transition section differs in the first and the second pivoted positions. Thus, preferably this transition section can likewise serve as a second pivoting section. The said wall region therefore preferably extends between the said transition section and the above-mentioned pivoting section. In the event of pivoting of the wall portion, this transition section and the pivoting section are curved in opposite directions or the respective curvatures change in opposite directions.

In a further advantageous embodiment the central region has a centre region which is formed substantially perpendicularly to the longitudinal direction and which preferably lies nearer to the mouth portion than the pivoting section in the longitudinal direction of the plastic container. In this case, lying nearer to the mouth portion is in particular understood to mean that in the case of an upright container this centre region (and in particular the highest-placed part thereof) is located higher than the said pivoting section. This means that the projection reaches further into the interior of the container than the height of the said pivoting section.

A central region which is formed substantially perpendicularly to the longitudinal direction is understood to mean that this central region forms an angle which is smaller than 20°, preferably smaller than 15°, preferably smaller than 10° and particularly preferably smaller than 5°, with respect to the horizontal direction or the direction perpendicular to the longitudinal direction. Moreover, with the said horizontal orientation any injection point located in the centre is ignored.

In a further advantageous embodiment the main body and in particular the circumferential wall of the main body has no elements which are suitable and intended specifically in order to compensate for negative pressure which occurs. This should be understood to mean that this wall in particular does not have the panels which are present in the prior art in some instances, in order to compensate for negative pressures which occur inside the container.

In a further advantageous embodiment the central region has a further substantially rectilinear section which also extends at least in the longitudinal direction of the container. This rectilinear section preferably encloses with the longitudinal direction of the container an angle which is between 0° and 50°, preferably between 0° and 40°, preferably between 0° and 30°, preferably between 0° and 20° and particularly preferably between 0° and 10°. The central region preferably merges via a curved section into the said rectilinear section.

In a further advantageous embodiment a circumferential outer transition section extending away from the mouth region in the longitudinal direction of the container adjoins the pivoting section in a radial direction of the plastic container. Therefore, this outer transition section preferably extends downwards (in the case of an upright container) at least also with a component in the longitudinal direction of the container.

This transition section preferably extends substantially rectilinearly. However, it would also be conceivable that this transition section has a curvature with a very high radius of curvature, for example a radius of curvature of more than 5 cm, preferably more than 10 cm.

This transition section preferably encloses with the longitudinal direction of the plastic container an angle which is preferably smaller than 40°, preferably smaller than 30°, preferably smaller than 25°, preferably smaller than 20° and particularly preferably smaller than 15°.

In a further advantageous embodiment a circumferential rectilinear section is formed between an outermost groove and the said transition section. A circumferential rectilinear section is preferably also formed between the innermost groove and the central region. In this case a rectilinear configuration is understood to be a configuration which extends rectilinearly or substantially rectilinearly in a projection which is perpendicular to the longitudinal direction of the container.

In a further advantageous embodiment a support portion extending substantially perpendicularly to the longitudinal direction adjoins the circumferential outer transition section. The container is preferably set down on this support portion.

Thus, this support portion extends substantially in an annular manner and the container rests on this support portion. This support portion is preferably inclined relative to a horizontal direction by no more than 30°, preferably by no more than 20°, preferably by no more than 10° and particularly preferably by no more than 5°.

In a further advantageous embodiment at least one recess is arranged in this said support portion and, in the case of an upright container, is spaced apart from a standing surface of the container. At least two recesses, preferably at least three recesses and particularly preferably at least four recesses, are advantageously arranged in the support portion. Particularly preferably, these recesses are uniformly distributed in the circumferential direction of the container.

In this case it is possible that an individual recess encloses a circumferential angle (viewed with respect to the longitudinal direction of the container) which is greater than 5°, preferably greater than 10°, preferably greater than 15° and particularly preferably greater than 20°. In a further preferred embodiment, this recess encloses a circumferential angle which is smaller than 60°, preferably smaller than 50°, preferably smaller than 40° and particularly preferably smaller than 30°.

In a further advantageous embodiment, at least one web which extends at least in part in a radial direction of the container or of the base wall is arranged in the wall extending in the circumferential direction. In this case it is preferably conceivable that this web also has a curved profile and in particular a uniform curvature.

In a preferred embodiment this web connects individual grooves and particularly preferably extends from the central region to the pivoting section. Particularly preferably, the base section has at least two such webs, preferred at least three such webs and particularly preferably four such webs. Particularly preferably, these four webs are uniformly distributed in a circumferential direction of the base section.

In a further advantageous embodiment, the said web at least partially fills at least one groove and preferably several grooves. This web preferably has a cross-section which changes in the extension direction of the web. Thus, it would be conceivable that the web fills the individual grooves in its extension direction. It would also be conceivable that a width of this web (viewed in the circumferential direction) varies and in particular between two grooves is smaller than in the grooves themselves.

This web preferably serves for stabilisation of the base wall section.

In a further preferred embodiment a groove which is circumferential with respect to the longitudinal direction is arranged in the main body, wherein this groove is preferably arranged in at least one pivot position below at least one section of the central region. This is preferably the upper pivot position, in which the internal volume of the container is reduced. In this preferred embodiment, at least in a raised position of the base portion (in which the internal volume of the container is reduced), a tip or an upper region of the projection is arranged in the longitudinal direction above the circumferential groove.

Since the container geometry of the base side wall for the type of container base described here must be very stable in order in a cooled state to facilitate the defined folding over of the base portion, the aforementioned stabilisation geometry in the form of the groove is preferably arranged in the base side wall, that is to say in the main body. However, it would also be conceivable to dispense with such a groove. In this case the said groove can be configured as a trapezoidal geometry, but circular, elliptical, rectangular or triangular geometries would also be conceivable as a variant for this groove. In this case the height position of this circumferential groove can be chosen as a function of the height of an injection point of the container or also in a ratio to a height of a pivot point or centre of rotation of the pivot section. The ratio of the height of the pivot section to the height of the circumferential groove (measured from the standing surface of the base) is preferably between 0.5 and 3.5, preferably between 1.0 and 2.5. A ratio between the height of the injection point and the height of the circumferential groove may be, for example, between 0.5 and 2.5.

In a further advantageous embodiment, a depth of penetration of this circumferential groove is substantially perpendicular to an outer surface of the base. In this case this depth can range between 0.5 mm and 5 mm, preferably between 1 mm and 3 mm.

An opening angle of the said groove can be for example between 40° and 160°, preferably between 50° and 120° and particularly preferably between 60° and 90°.

In a further advantageous embodiment, a connecting section which extends in a radial direction of the container is arranged between at least two grooves of the wall extending in the circumferential direction. In this case this section is shorter than the extent of the respective groove in the radial direction. Preferably in this case, this section is shorter than 80% of the radial extent of the groove, preferably shorter than 70%, preferably shorter than 60%, particularly preferably shorter than 50% and particularly preferably shorter than 40%.

In a further preferred embodiment this connecting section extends substantially rectilinearly. However, it would also be possible that this connecting section is curved with a very high radius of curvature.

In this case, in a further advantageous embodiment this connecting portion likewise extends in a circumferential direction of the container or of the container base.

Furthermore, the present invention is directed to a blow moulding arrangement for producing plastic containers, wherein this blow moulding arrangement has a base part which in turn has a surface which is suitable and intended for producing a plastic container of the type described above.

This blow mould preferably allows a movement of the base part of the blow mould relative to the lateral parts in the longitudinal direction of the plastic container during a blow moulding process.

Further advantages and embodiments are apparent from the appended drawings.

DETAILED DESCRIPTION OF THE INVENTION

Figure 1A:
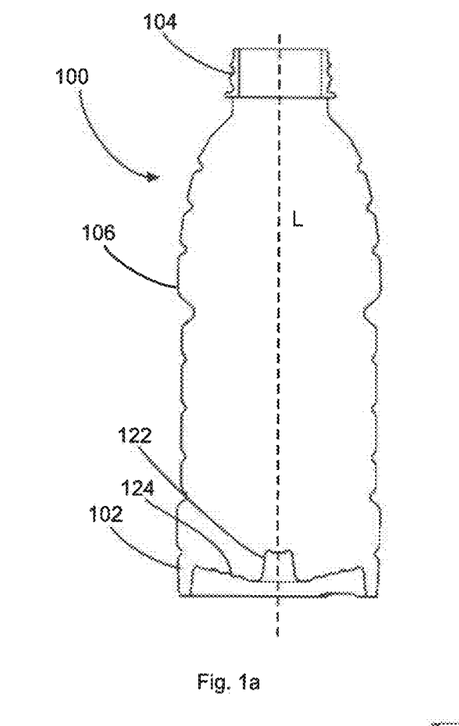
FIG. 1a shows a simplified representation of a container according to the invention.

FIG. 1a shows a side view of a container 100 according to the invention. This container has a mouth portion 104 which is adjoined at least indirectly by a main body 106. This main body is formed circumferentially with respect to the longitudinal direction L of the container 100. The reference 102 designates the base portion of the container 100. In this case the reference 122 relates to a central region of this base portion 102 and the reference 124 relates to the wall which extends in the circumferential direction of the container or is formed circumferentially. Therefore in FIG. 1a this wall 124 extends perpendicularly to the drawing plane. In the state shown in FIG. 1a the container is filled with a hot beverage.

For the production of this pivotable base of the container, a blow mould is preferably used, which during the blow moulding process allows a movement of a base part of this blow mould relative to the lateral parts of the blow mould. In this case the base part of the blow mould is preferably lifted relative to the lateral parts of the blow mould by less than 20 mm. In the state shown in FIG. 1a, however, a base part of the blow mould is in a retracted state.

Figure 1B:
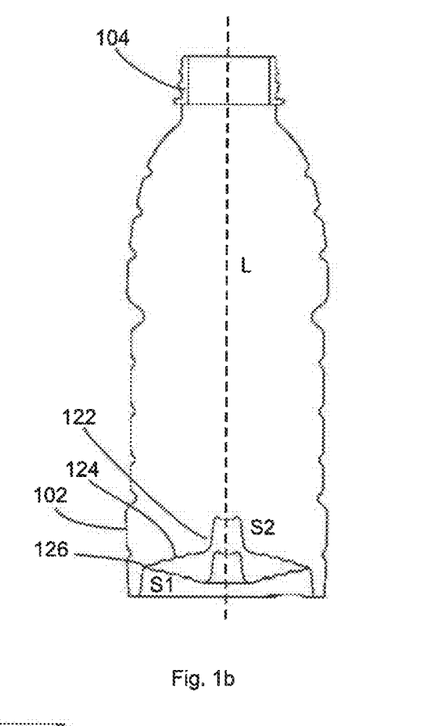
FIG. 1b shows a representation of the pivot positions of the base of the container.
Figure 1C:
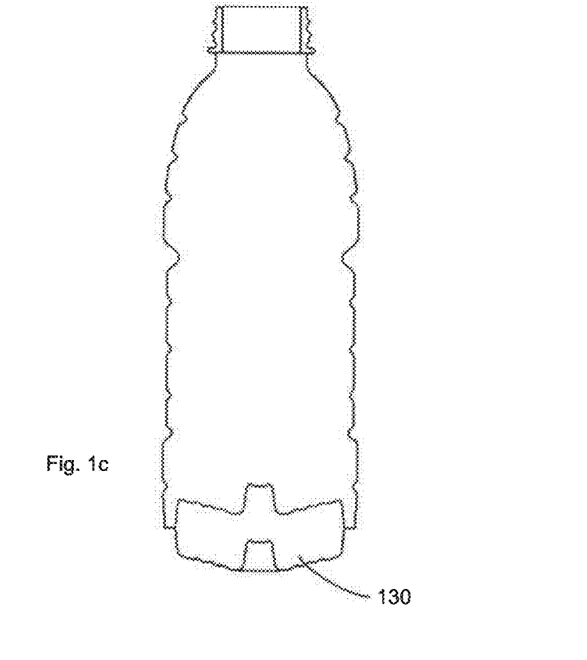
FIG. 1c shows a representation of the container with a base part.

FIG. 1b shows a further representation of the container shown in FIG. 1a. In this case in particular the two pivot positions S1, S2 of the base portion 102, more precisely the wall 124, are illustrated. In the position S2 an internal volume of the base is reduced in size relative to the position S1. The reference 126 designates a pivot section which runs round relative to the longitudinal direction of the container and relative to which the wall 124 is pivotable between the upper position S2 and the lower position S1.

The position S2 is reached after the hot bottling, the closure and the cooling. The container has undergone generation of a vacuum and the loudspeaker diaphragm, i.e. the wall 124, is folded over during vacuum generation.

Figure 2A:
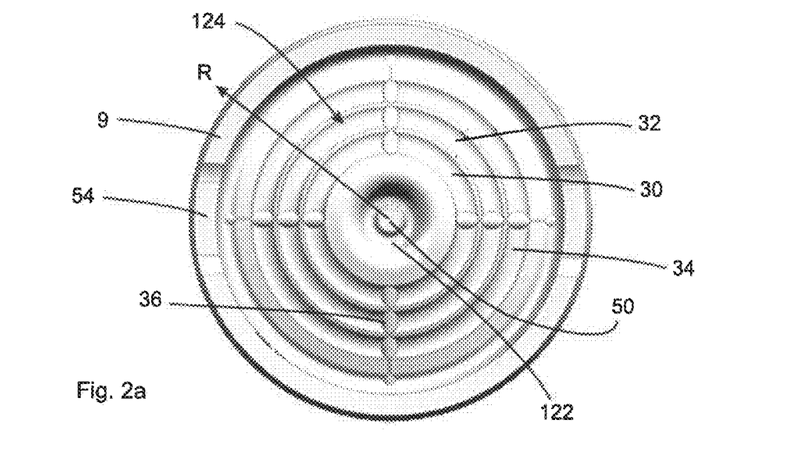
FIG. 2a shows a plan view of the base of a container according to the invention.

FIG. 2a shows a plan view of the base of a container according to the invention. In this case this base 102 again has the central region 122 which is adjoined by the wall 124 which (also) extends in the circumferential direction. This circumferential wall has three grooves 30, 32 and 34 here which protrude into the container. In this case these grooves each have an elliptical cross-section. The reference 36 designates a web extending in a radial direction R. The reference 9 designates an annular support portion, on which the container 100 can stand upright. The reference 54 designates a recess, which is provided in this support portion.

Figure 2B:
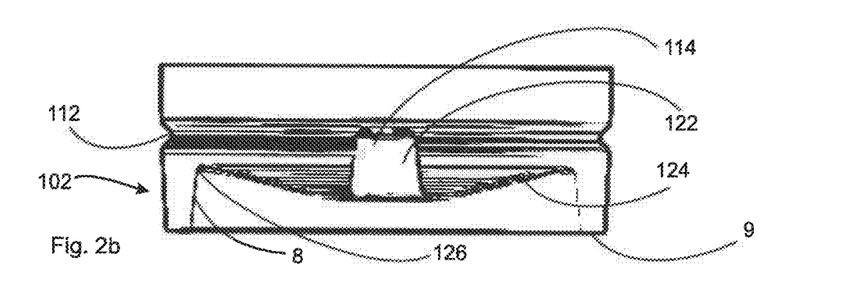
FIG. 2b shows a side view of the base of a container according to the invention.

FIG. 2b shows a side view of the base portion 102 (in the pivot position S1). It can be seen here that a rectilinear portion 8 adjoins the pivot section 126 radially towards the exterior and extends obliquely downwards with respect to the longitudinal direction L. In addition, the support portion 9 is also again visible. The reference 114 designates an upper region of the central region 122. In addition, the circumferential groove 112 (in the main body 106) can also be seen. It will be recognised that this circumferential groove is located here at approximately the same height position as the upper region 114. In the second pivot position (not shown) the upper region 114 would project beyond the height level of the groove.

Figure 2C:
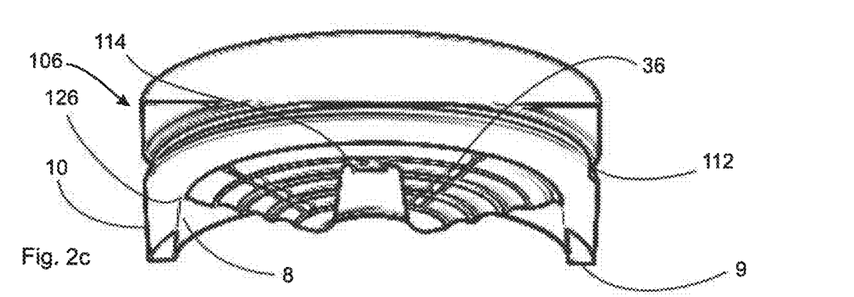
FIG. 2c shows a perspective view of the base of a container.

FIG. 2c shows a perspective representation of the base 102, wherein again here the pivot section 126 and the wall portions 8 and 9 can also be seen. The reference 10 designates a further wall portion in which the base portion 102 merges into the main body 106.

Figure 2D:
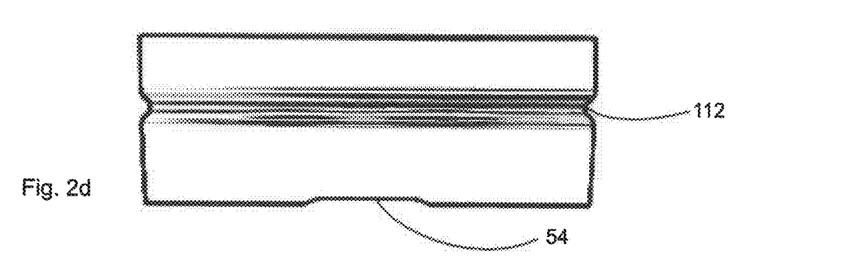
FIG. 2d shows a side view of the base of a container according to the invention.

FIG. 2d shows a further side view of the base part, wherein here too a recess 54 in the support portion 9 can again be seen.

Figure 3:
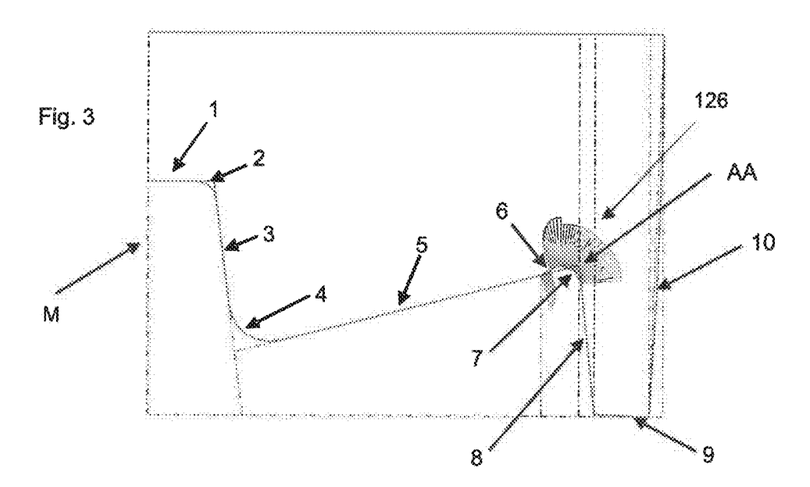
FIG. 3 shows a representation of a base contour of the base.

FIG. 3 shows a side view of the base contour of the base part 102 of the container 100, that is to say without taking account of the grooves which are formed on the wall 124 (or on the rectilinear portion 5). The base contour is described by the straight line 1, the radius 2, the straight line 3, the radius 4, the straight line 5, the spline 6, the spline 7, the straight line 8, the straight line 9 and the radius 10.

From this contour the so-called outer surface of the base geometry is produced by a rotation about the axis of rotation M. A spline of n-th degree (also polynomial curve) is a function which is assembled piecemeal from polynomials of at most n-th degree. In this case at the points at which two polynomial terms collide (also referred to as nodes), specific conditions are set, for instance that the spline can be continuously differentiated (n−1)-times.

The transitions of the straight line 1, the radius 2, the straight line 3, the radius 4, the straight line 5 are preferably at least partially and particularly preferably all tangentially constant. The transition from the straight line 5 to the spline 6 can be curvature-constant, but at least tangentially constant. The spline 6 merges into the spline in a curvature-constant, at least tangentially constant manner.

The curvature profile of the spline 6 can be described by a polynomial of n-th degree. In this case the degree of the polynomial can be from n=2 to n=7. The transition from the spline 7 into the straight line 8 can be curvature-constant, but at least tangentially constant. The curvature profile of the spline 7 can be described by a polynomial of n-th degree. In this case the degree of the polynomial can be from n=2 to n=7.

Furthermore, the straight line 1, the radius 2, the straight line 3, the radius 4, the straight line 5, the spline 6 and the spline 7 describe a so-called loudspeaker diaphragm which, during controlled cooling of the closed bottle from the bottling temperature of the hot-filled product to room temperature by means of a recooler, folds in or snaps in at the centre of rotation AA, since a vacuum is produced in the bottle here. Thus, this centre of rotation AA is also arranged in the above-mentioned pivot section 126.

Figure 4:
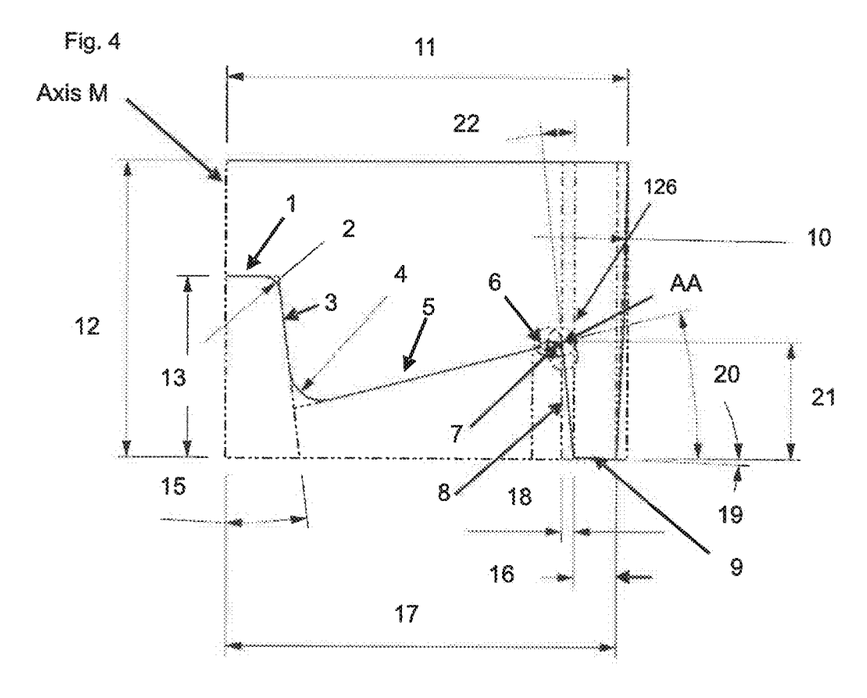
FIG. 4 shows a further representation of a base contour of the base.

FIG. 4 shows a further representation for illustration of the base contour. The external dimensions of the base are defined by the outer radius 11 and the base height 12. The dimension of the pitch circle diameter 17 is defined by a ratio with respect to the external diameter 11. This ratio can vary between 0.8 and 0.99, and preferably between 0.85 and 0.995, but in particular between 0.90 and 0.98.

The height 13 of the straight line 1 can be defined in a ratio to the external diameter 11 or to the base height 12. The angle 15 of the straight line 3 can vary preferably between 1° and 30°, preferably between 3° and 30°, but in particular between 5° and 15°.

The angle 22 of the straight line 8 (relative to the vertical) is preferably greater than 0°, preferably greater than 1°, preferably greater than 2° and particularly preferably greater than 3°. Further, this angle is preferably smaller than 30°, preferably smaller than 25°, preferably smaller than 20°, preferably smaller than 15° and particularly preferably smaller than 14°.

The angle 20 of the straight line 5 (relative to the horizontal) can be greater than 0°, preferably greater than 2°, preferably greater than 4° and particularly preferably greater than 5°. Furthermore, this angle is preferably smaller than 40°, preferably smaller than 30°, preferably smaller than 25°, particularly preferably smaller than 21°.

The angle 19 of the straight line 9 (in particular relative to the horizontal) can preferably be greater than 0°, preferably greater than 1°. Furthermore, this angle is preferably smaller than 10°, preferably smaller than 8° and particularly preferably smaller than 6°.

The height 21 of the straight line 8 can vary (in particular in the case of a lift between 20 and 60 mm) preferably in a range which is greater than 0.5 mm, preferably greater than 1.0 mm, preferably greater than 3 mm and particularly preferably greater than 5.0 mm. The height is preferably less than 15 mm, preferably less than 13 mm, preferably less than 10 mm.

Figure 5:
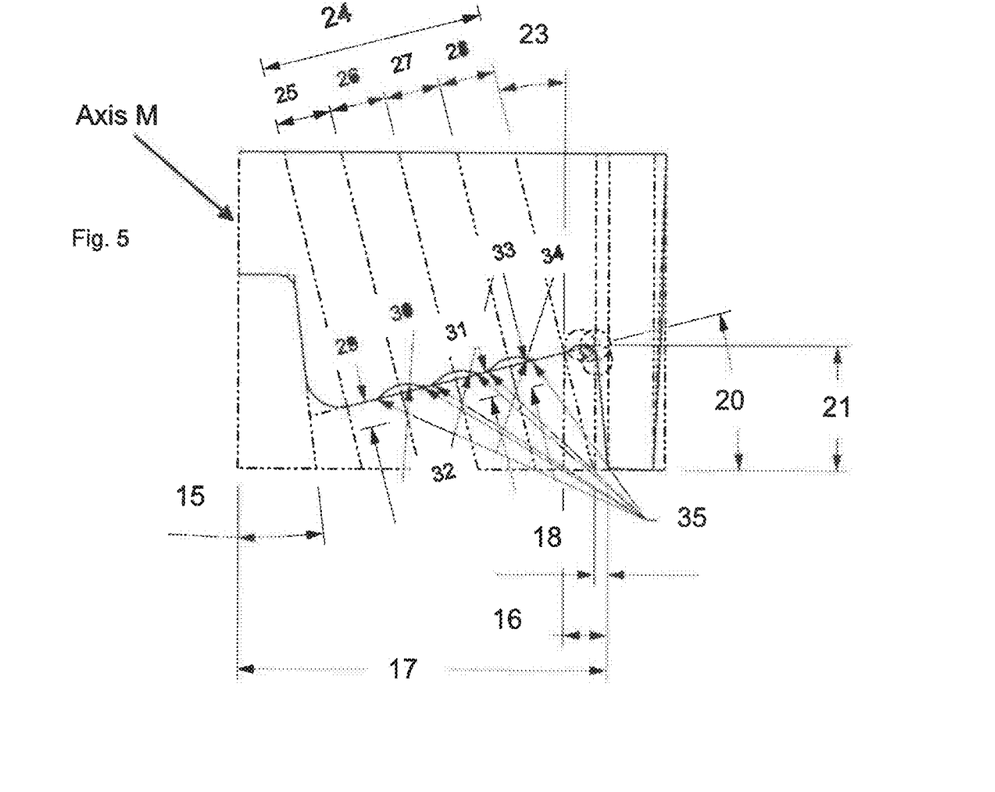
FIG. 5 shows a representation of the base contour including the grooves.

FIG. 5 shows a representation of the base contour, wherein the individual further elements, such as in particular the above-mentioned grooves 30, 32 and 34 are also illustrated here. The straight line 5 of the loudspeaker diaphragm contour can have various geometric elements, in this case with a penetrating radius or circular arc geometry (i.e. the grooves 30, 32 and 34), that is to say recessed in the bottle. Thus, in this embodiment the grooves protrude into the interior of the container.

However, this geometry can also be reversed, so that the grooves are shown raised on the bottle. In the variant with the circular arcs, the radius of these grooves is preferably greater than 1.0 mm, preferably greater than 1.2 mm, preferably greater than 1.5 mm. The radius is preferably less than 20 mm, preferably less than 18 mm, preferably less than 15 mm, preferably less than 13 mm and particularly preferably less than 11 mm.

Furthermore, elliptical and conical, trapezoidal or even triangular geometries or mixed forms of this geometries are also possible. These respective geometries could all be recessed in the bottle or also raised, as well as alternately recessed and raised. The number of geometric elements or grooves 30, 32 and 34 can preferably be between 1 and 10, but in particular between 2 and 7. These elements can be distributed regularly (or with regular spacings 25, 26, 27 and 28) and also irregularly on the straight line 5, or with equal spacing and also unequal spacing relative to one another. The reference 24 designates the sum of the spacings 25, 26, 27 and 28.

The grooves can all have the same depth 29, 31, 33, but it would also be possible that each element has a different depth. The geometric elements or grooves 30, 32 and 34 can also be arranged at a ratio relative to the depth of the elements (29, 31 and 33). Thus, a groove which is longer in the radial direction could for instance have a greater depth.

The roundings 35 of the individual grooves, that is to say in particular the region in which the respective grooves merge into the basic contour can be the same size for each groove, but it is also possible that each geometric element or each groove 30, 32 and 34 has a rounding of to a different size.

The angle 23 can be equal or unequal to the angle 20, in order to define the position, characteristics and direction of the geometric elements or grooves 30, 32 and 34.

Figure 6:
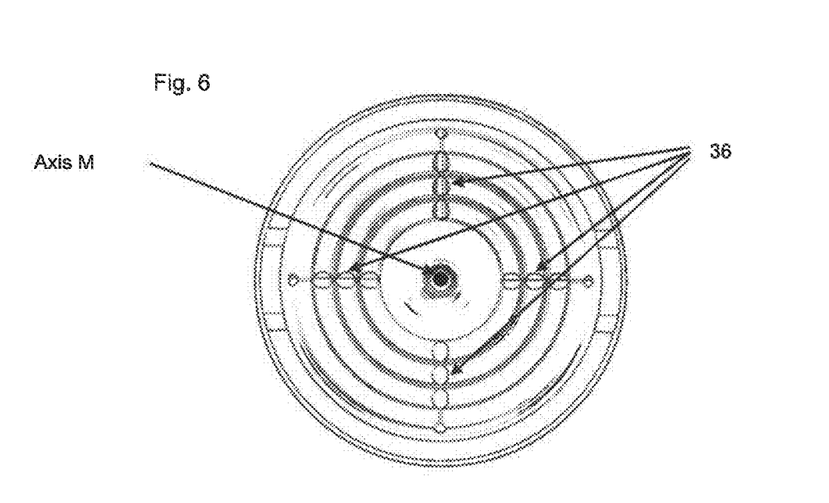
FIG. 6 shows a plan view from below of the base.

FIG. 6 shows a further view of the base of the plastic container. The number of interruption elements or webs 36 of the loudspeaker diaphragm can be between 2 and 12, preferably between 3 and 8. It will be recognised that here the webs in each case fill the individual grooves substantially completely. In the illustrated embodiment the webs are interrupted by edge portions of the grooves 30, 32 and 34.

Figure 7:
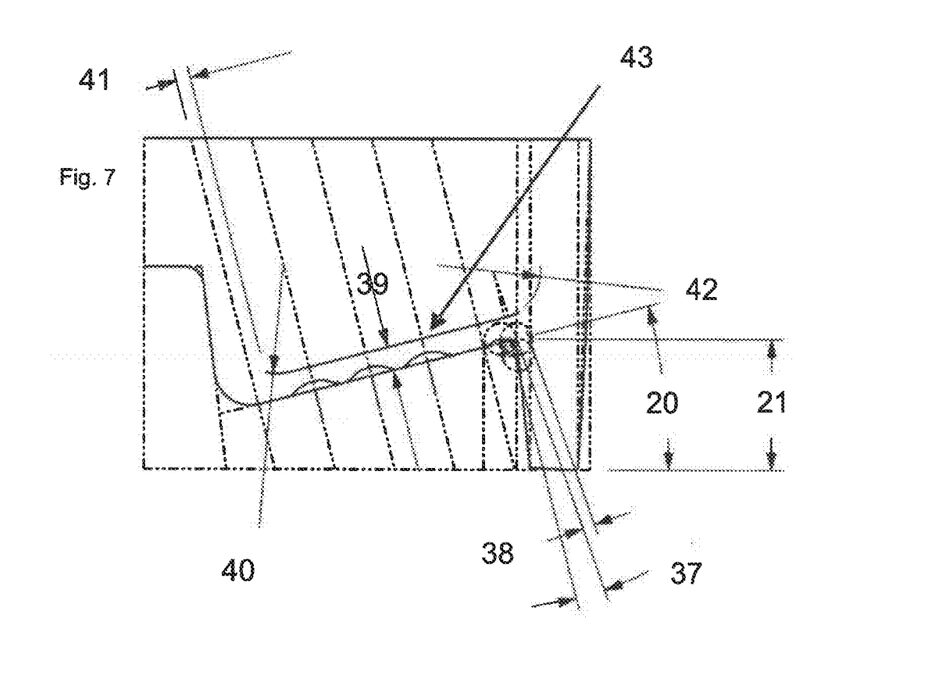
FIG. 7 shows a further representation the base contour.
Figure 8:
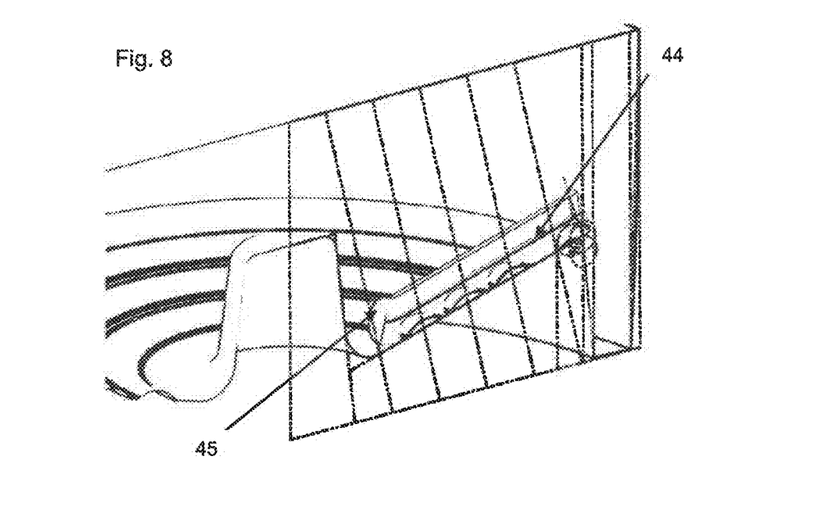
FIG. 8 shows a perspective view of the base contour.

FIGS. 7 and 8 show further views of the container base to illustrate the geometries. The guiding 44 (cf. FIG. 8) of the interruption geometry is described by the radius 40, the straight line 43, the radius 42, the angle 37 and the straight line 38. This can be parallel to the so-called loudspeaker diaphragm, with a spacing 39 or also at an angle thereto. Furthermore, the interruption geometry can be both raised and also recessed in the base, which means that the guiding contour 44 can be located with the spacing 39 both above and also below the so-called loudspeaker diaphragm.

The cross-sectional contour 45 (cf. FIG. 8) for the interruption geometry can be configured as a circular geometry with a diameter. However, it would also be possible for the cross-sectional contour to be configured as a variant of an elliptical, trapezoidal, rectangular and triangular geometry or also as a mixed form of these geometries.

Figure 9:
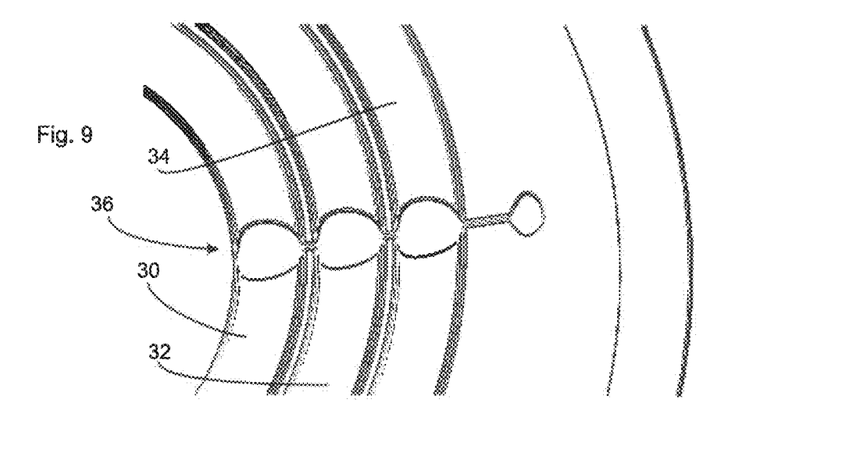
FIG. 9 shows a view of a detail of the base contour.

As illustrated in FIG. 9, the webs or the interruption geometry should interrupt the interstices of the geometric elements or grooves 30, 32 and 34 of the loudspeaker diaphragm in order to facilitate the folding over of the diaphragm when a vacuum is produced. The interruption geometry should not be rounded, but it is also possible for it to be rounded. The webs are interrupted by the transitions between the individual grooves 30, 32 and 34. Thus, the webs are not necessarily continuous webs but they can also be interrupted.

Figure 10:
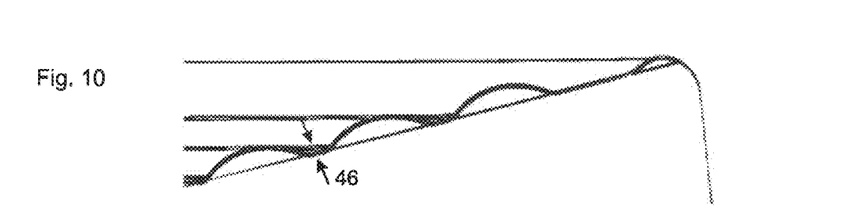
FIG. 10 shows a perspective view of a detail of the base contour.

FIG. 10 shows an enlarged representation of the groove geometries. The reference 46 designates a spacing between the loudspeaker diaphragm and the individual grooves.

The spacing should be greater than 0.001 mm, preferably greater than 0.002 mm, preferably greater than 0.004 mm, preferably greater than 0.008 mm and particularly preferably greater than 0.01 mm. Furthermore, this spacing should be less than 2.0 mm, preferably less than 1.5 mm, preferably less than 1.0 mm and particularly preferably less than 0.5 mm.

Since the bottle geometry and the base side wall for this type of base must be very stable, in order to facilitate the folding over of the loudspeaker diaphragm in the cooled state, the base side wall requires a stabilisation geometry, but it is also conceivable that it also functions without the stabilisation geometry.

Figure 11:
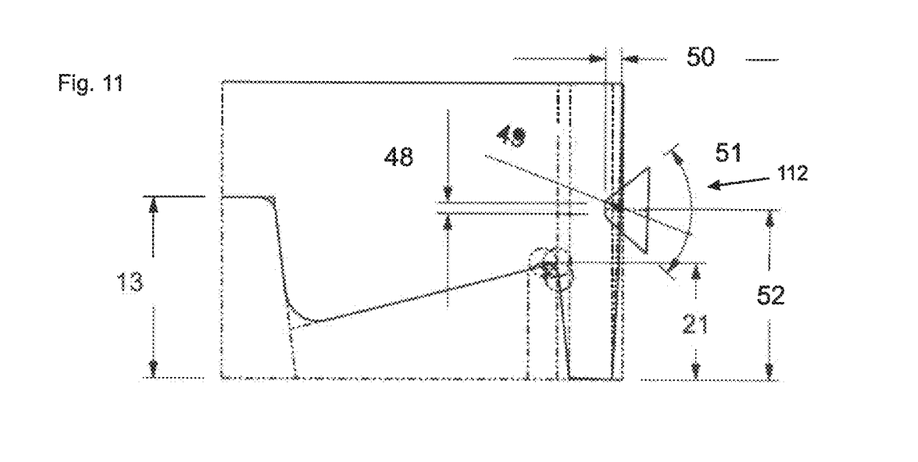
FIG. 11 shows a further side view of the base.

FIG. 11 shows a further side view of the base, wherein the circumferential groove 112 is here also illustrated. This groove or stabilisation geometry 112 can be configured as a trapezoidal geometry, as shown in FIG. 11, but also any other circular, elliptical, rectangular and triangular geometry or also mixed geometry as a variant for this "encircling ring" is conceivable. The reference 49 describes an opening angle of the groove and the reference 48 describes the height of a base of this channel.

The height position 52 may be defined as a function of the height of the injection point 13 and/or of the height 21 of the centre of rotation of the loudspeaker diaphragm. The ratio of the height 21 to the height 52 can preferably be between 1.0 and 2.5. The ratio of the height 13 of the injection point to the height 52 can preferably be between 0.5 and 2.0. The depth of penetration 50 of the stabilisation geometry or groove 112 is preferably perpendicular to the outer surface of the base.

This can preferably be greater than 0.5 mm, preferably greater than 0.7 mm and preferably greater 1.0 mm. Furthermore, this height should be less than 5.00 mm, preferably less than 4 mm and particularly preferably less than 3.00 mm. The opening angle 51 can preferably be greater than 50°, preferably greater than 55° and particularly preferably greater than 60°. Furthermore, this angle is preferably smaller than 120°, preferably smaller than 110°, preferably smaller than 100° and particularly preferably smaller than 90°.

Figure 12:
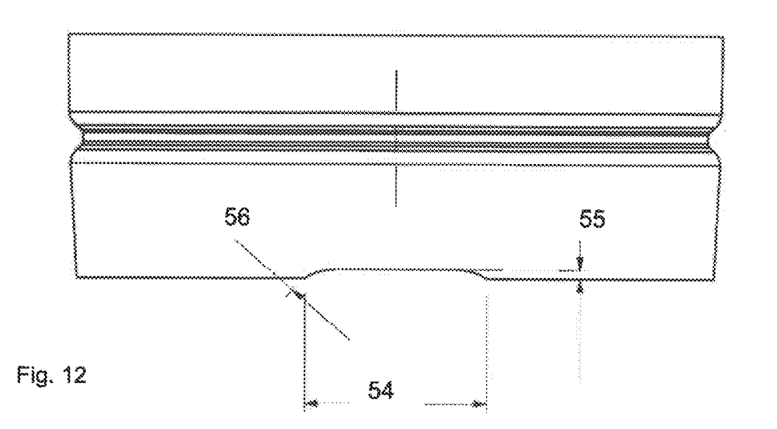
FIG. 12 shows a side view of the base showing the recess.

FIG. 12 shows a further side view of the base part of the plastic container. In order to improve the stability of the base, a recess 54 has been introduced. This recess subdivided the standing surface 53 into 2 to 8 parts. A further effect of the recess is that, as a result, the configuration of the base geometry can be assessed.

The width of the recess 54 may be in a ratio to the external diameter 11 but does not have to be. This ratio may be between 0.1 and 0.9. The height of the recess 54 may be greater than 0.1 mm, preferably greater than 0.2 mm, preferably greater than 0.3 mm, preferably greater than 0.4 mm and particularly preferably greater than 0.5 mm. Furthermore, this height may be less than 6.0 mm, preferably less than 5.0 mm, preferably less than 4.0 mm and particularly preferably less than 3.0 mm.

In this connection it is pointed out that the individual measurement details specified in the context of the description can be combined with one another in any manner, and in particular, unless stated otherwise, a specific measurement for a specific size not automatically lead to a different measurement for another size.

The applicant reserves the right to claim all the features disclosed in the application documents as essential to the invention in so far as they are individually or in combination novel over the prior art. Furthermore it is pointed out that features which may be advantageous per se have also been described in the individual drawings. The person skilled in the art recognises immediately that a specific feature described in a drawing may also be advantageous without the incorporation of further features from this drawing. Furthermore the person skilled in the art recognises that advantages may also result from a combination of several features shown in individual drawings or in different drawings.

LIST OF REFERENCES 1 straight line
2 radius
3 straight line
4 radius
5 straight line
6 spline
7 spline
8 straight line
9 straight line
10 radius
11 outer radius
12 base height
13 height
15 angle
17 pitch circle diameter
19 angle
20 angle
21 height
22 angle
23 angle
24 sum of the spacings
25, 26, 27, 28 spacings 29, 31, 33 depth
30, 32, 34 groove
36 web
37 angle
38 straight line
39 spacing
40 radius
42 radius
43 straight line
44 guide contour
45 cross-sectional contour
46 spacing
48 height of the base of the groove 112
49 opening angle of the groove 112
50 depth of penetration
51 opening angle
52 height
54 recess
55 height
100 plastic container
102 base portion
104 mouth portion
112 groove
114 upper region of the central region 122
122 central region
124 wall extending in the circumferential direction
126 pivot section
L longitudinal direction
R radial direction
AA centre of rotation
S1, S2 pivot position

The invention claimed is:

1. A plastic container with a mouth portion, a main body adjoining this mouth portion in a longitudinal direction of the plastic container, said main body completely surrounding an internal volume of the plastic container in a circumferential direction of the plastic container, and with a base which adjoins the main body, wherein the base has a central region as well as a diaphragm which runs in the circumferential direction of the plastic container and extends from the central region to the main body, wherein the central region is pivotable relative to the main body between at least two positions, and wherein said two positions differ with regard to an internal volume of the plastic container, and wherein, in order to reach the pivot positions between the central region and the main body, a pivot section is formed which is circumferential with respect to the longitudinal direction of the plastic container, wherein the diaphragm has at least two grooves which are at least partially circumferential with respect to the longitudinal direction of the plastic container and are spaced apart from one another, and the central region has a projection extending in the direction of the interior of the plastic container, and wherein at least one web extending at least in part in a radial direction is arranged in the circumferential running diaphragm and wherein the web connects individual grooves and extends from the central region to the pivot section.

2. The plastic container according to claim 1, wherein the pivot section is formed radially outside the circumferential grooves.

3. The plastic container according to claim 1, wherein in a curved circumferential transition section the central region merges into the wall, wherein a curvature of this transition section differs in the first and the second pivot position.

4. The plastic container according to claim 1, wherein the central region has a centre region which is formed substantially perpendicularly to the longitudinal direction and which preferably lies nearer to the mouth portion than the pivot section in the longitudinal direction of the plastic container.

5. The plastic container according to claim 1, wherein a circumferential outer transition section extending away from the mouth region in the longitudinal direction of the container adjoins the pivot section in a radial direction of the plastic container.

6. The plastic container according to claim 5, wherein a support portion of the plastic container extending substantially perpendicularly to the longitudinal direction adjoins the circumferential outer transition section.

7. The plastic container according to claim 5, wherein a groove which is circumferential with respect to the longitudinal direction is arranged in the main body, wherein this groove is preferably arranged in at least one pivot position below at least one section of the central region.

8. The plastic container according to claim 1, wherein a connecting section extending in a radial direction of the container is arranged between at least two grooves.

9. A blow moulding arrangement for producing plastic containers, wherein the blow moulding arrangement has a base part which has a surface configured for producing a plastic container according to claim 1.

10. A blow moulding arrangement for producing plastic containers, wherein the blow moulding arrangement has a base part which has a surface configured for producing a plastic container according to claim 2.

11. A blow moulding arrangement for producing plastic containers, wherein the blow moulding arrangement has a base part which has a surface configured for producing a plastic container according to claim 3.

12. A blow moulding arrangement for producing plastic containers, wherein the blow moulding arrangement has a base part which has a surface configured for producing a plastic container according to claim 4.

13. A blow moulding arrangement for producing plastic containers, wherein the blow moulding arrangement has a base part which has a surface configured for producing a plastic container according to claim 5.

14. A blow moulding arrangement for producing plastic containers, wherein the blow moulding arrangement has a base part which has a surface configured for producing a plastic container according to claim 6.

15. A blow moulding arrangement for producing plastic containers, wherein the blow moulding arrangement has a base part which has a surface configured for producing a plastic container according to claim 7.

16. A blow moulding arrangement for producing plastic containers, wherein the blow moulding arrangement has a base part which has a surface configured for producing a plastic container according to claim 8.

17. The plastic container according to claim 1, wherein the main body and in particular the circumferential diaphragm of the main body has no elements which are suitable and intended specifically in order to compensate for negative pressure which occurs.

18. The plastic container according to claim 1, wherein the webs in each case fill the individual grooves substantially completely and the webs are interrupted by edge portions of the grooves.

19. The plastic container according to claim 1, wherein the base section has at least four such webs.

20. The plastic container according to claim 1, wherein the web preferably has a cross-section which changes in the extension direction of the web, wherein a width of this web viewed in the circumferential direction varies and in particular between two grooves is smaller than in the grooves themselves.

* * * * *